(No Model.)
T. E. SOMERVILLE.
NUT LOCK.
No. 568,416.  Patented Sept. 29, 1896.
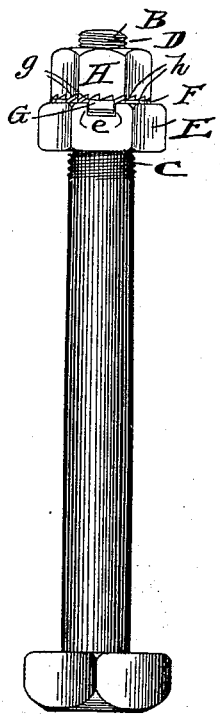
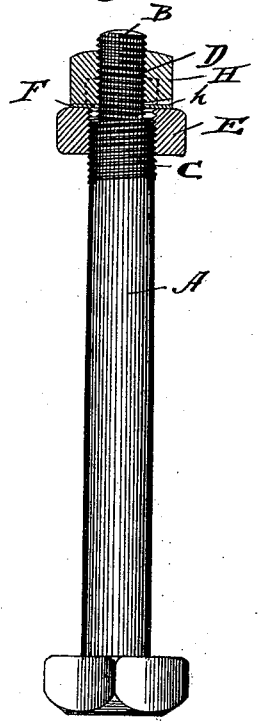
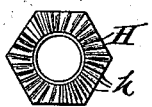
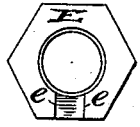
Witnesses,
Inventor,
Thomas E. Somerville
By Offield Towle Linthicum
Attys.

ns, but which for the purpose of my invention is provided on its outer face with a locking-notch having shoulders $e$. Said notch and shoulders may be conveniently provided by grooving, upsetting, or otherwise working the face of the nut with a cutting-tool, die, or stamp. The washer, punched from spring-steel, is provided with a central aperture $f$ of such diameter as to pass over the threads D on the reduced portion of the bolt. The margin of such washer is provided with a series of radial slits $f'$. The metal between two of these slits is bent down to afford a spring-tongue or locking-wing G. The portions of the metal between the remaining slits are bent, as shown particularly in Figs. 1 and 4, into planes at an angle to the plane of the body of the washer, so as to provide a series of spring-wings or locking-tongues $g$, one edge of each spring wing or tongue projecting above the plane of the body and being thus adapted to engage with the locking-shoulders $h$ of the locking-nut H.

UNITED STATES PATENT OFFICE.

THOMAS E. SOMERVILLE, OF CHICAGO, ILLINOIS.

NUT-LOCK.

SPECIFICATION forming part of Letters Patent No. 568,416, dated September 29, 1896.

Application filed December 10, 1895. Serial No. 571,643. (No model.)

*To all whom it may concern:*

Be it known that I, THOMAS E. SOMERVILLE, of Chicago, Illinois, have invented certain new and useful Improvements in Nut-Locks, of which the following is a specification.

The object of this invention is to provide a nut-lock of simple and economical construction capable of effecting a positive lock upon a nut in any position to which it may be turned without retrograde movement and further capable of a new adjustment.

The invention comprises, in combination, a bolt having a reduced end and provided with threads both upon the body of the bolt and upon the reduced portion, the two sets of threads being of opposite pitch; a holding-nut adapted to the threads upon the body of the bolt; a washer or locking-plate adapted to pass freely over the reduced portion and to lie against the outer face of the holding-nut, and a locking-nut adapted to the threads of the reduced portion of the bolt, both of said nuts being provided with notches and shoulders on their proximate surfaces, and the washer being provided with radial tongues or wings, arranged in planes different from the plane of the body of the washer and adapted to engage with the locking-shoulders both upon the holding and locking nuts.

In the accompanying drawings, Figure 1 is an elevation showing the several parts in proper relation and in the locked position. Fig. 2 is a sectional elevation through the nuts and locking-plate or washer. Fig. 3 is a plan view of the inner face of the locking-nut. Fig. 4 shows in plan and edge views the locking-plate or washer, and Fig. 5 a plan view of the outer face of the holding-nut.

In the embodiment of my invention shown in the accompanying drawings I have shown a bolt such as would be suitable for clamping the fish-plates in uniting railway-rails, but the same bolt may also be used in various machines and is a stock size. The body of the bolt (marked A) has its extremity B opposite the head reduced in diameter, the body portion being provided with right-hand threads, as at C, and the reduced portion with left-hand threads, as at D.

E represents the holding-nut, which is of the usual hexagonal form with rounded corners, but which for the purpose of my invention is provided on its outer face with a locking-notch having shoulders $e$. Said notch and shoulders may be conveniently provided by grooving, upsetting, or otherwise working the face of the nut with a cutting-tool, die, or stamp. The washer, punched from spring-steel, is provided with a central aperture $f$ of such diameter as to pass over the threads D on the reduced portion of the bolt. The margin of such washer is provided with a series of radial slits $f'$. The metal between two of these slits is bent down to afford a spring-tongue or locking-wing G. The portions of the metal between the remaining slits are bent, as shown particularly in Figs. 1 and 4, into planes at an angle to the plane of the body of the washer, so as to provide a series of spring-wings or locking-tongues $g$, one edge of each spring wing or tongue projecting above the plane of the body and being thus adapted to engage with the locking-shoulders $h$ of the locking-nut H.

The locking-nut H is adapted for threaded engagement with the reduced portion B of the bolt, and is provided on its inner surface with two series of locking-shoulders $h$, which may be formed in any convenient manner, as above described. These shoulders of each series are preferably unequally spaced, and the series may cover the entire surface of the locking-nut or any segmental part thereof. The purpose of graduating the notches is of course to guard against any retrograde movement of the locking-nut to effect an engagement with the spring-wings, and obviously it is better to divide said locking-shoulders into two series having corresponding graduations.

When the locking-nut is turned down so as to clamp a part or parts through which the body of the bolt passes, the washer or locking-plate is then applied and may be adjusted so that the spring-tongue G will rest in the notch and engage the locking-shoulders $e$ of the holding-nut. Then the lock-nut is turned on and tightened by advancing it upon the threads in the opposite direction to the movement of the holding-nut in tightening it. The locking-nut is turned down upon the washer, passing over the spring wings or tongues $g$ until it is tight. When so tightened, one of the shoulders $h$ of the locking-nut will engage one of the spring-tongues of the locking-plate in the same manner as the pawl of a ratchet-and-pawl device slips over, engages, and holds.

The purpose of arranging the the locking-shoulders upon the lock-nut at unequal distances apart or in graduated series is to effect the locking at the point in the precise position where further movement is arrested or when the parts have been tightened as far as possible and without permitting any retrograde movement of the locking-nut. Obviously if the locking-shoulders upon the lock-nut were spaced equidistant from each other and at equal intervals the lock might be tightened so that a retrograde movement thereof would be necessary to effect the locking engagement with the spring-tongue of the locking-plate.

From the foregoing description it will be obvious that this nut-lock is positive in its operation and that release of the parts is impossible, except by the release of the locking-tongue, which can be accomplished by the insertion of the point of a sharp instrument below said tongue, so as to permit the retrograde movement of the lock-nut.

It is further obvious that the locking may be effected in any position which the locking-nut may attain in tightening it up, and, further, that the spring-washer being between and protected by the opposing surfaces of the two nuts it affords a secure and rigid lock that will meet all of the exigencies of service, which is capable of being released when occasion requires, and which may be further tightened to compensate for wear or for adjustment without release.

In order to provide for a wide range of adjustment, it may be found expedient to countersink the inner face of the nut H, as indicated by the dotted lines in Fig. 2, the cavity thus produced being of sufficient diameter and depth to receive the threaded portion of the body of the nut, and in such cases the washer may also have an enlarged aperture.

Variations in the structural features and arrangements of parts may be made, as above indicated, or in other details of construction without departing from the spirit and scope of my invention.

I claim—

1. A nut-lock, comprising in combination with a bolt having adjacent portions thereof provided with screw-threads of opposite pitch, a holding-nut adapted to one set of said threads, a locking-nut adapted to the other set of threads, said holding-nut being provided on its outer face with a locking-notch and the locking-nut being provided on its inner face with a graduated series of locking-shoulders and a locking-plate constructed of spring metal and having its margin radially slitted and the metal between the slits being bent at an angle to the plane of the body of the plate whereby to provide locking wings or tongues adapted to the shoulders of the lock-nut, and a locking tongue or wing adapted to the locking-notch of the holding-nut, substantially as and for the purpose described.

2. A nut-lock, comprising in combination with a bolt having adjacent portions thereof provided with screw-threads of opposite pitch, a holding-nut adapted to one set of said threads and a locking-nut adapted to the other set of threads, said locking-nut being provided with two series of locking-shoulders disposed upon different portions of its inner face and the shoulders of the two series corresponding in arrangement, the intervals between adjoining shoulders increasing in width progressively, the holding-nut being provided on its outer face with a locking-notch and a locking-plate constructed of spring metal and having its margin slitted and the metal between the slits being bent at an angle to the plane of the body of the plate whereby to provide locking wings or tongues adapted to the shoulders of the lock-nut and a locking wing or tongue adapted to the locking-notch of the holding-nut, substantially as and for the purpose described.

THOMAS E. SOMERVILLE.

Witnesses:
FREDERICK C. GOODWIN,
N. M. BOND.